(12) United States Patent
Gerlach et al.

(10) Patent No.: US 10,221,329 B2
(45) Date of Patent: Mar. 5, 2019

(54) COMPOSITION FOR COATING

(71) Applicant: STO SE & CO. KGAA, Stuhlingen (DE)

(72) Inventors: Gunter Gerlach, Hufingen (DE); Christian Schaller, Neuhausen (DE); Alexander Farber, Wutach (DE); Walter Weh, Trossingen (DE); Gerald Burgeth, Lauchringen (DE)

(73) Assignee: STO SE & CO. KGAA, Stühlingen (DE)

( * ) Notice: Subject to any disclaimer, the term of this patent is extended or adjusted under 35 U.S.C. 154(b) by 0 days.

(21) Appl. No.: 15/102,194

(22) PCT Filed: Dec. 11, 2014

(86) PCT No.: PCT/EP2014/077401
§ 371 (c)(1),
(2) Date: Jun. 6, 2016

(87) PCT Pub. No.: WO2015/086757
PCT Pub. Date: Jun. 18, 2015

(65) Prior Publication Data
US 2016/0289487 A1 Oct. 6, 2016

(30) Foreign Application Priority Data

Dec. 12, 2013 (EP) .................................... 13196807
Jan. 23, 2014 (EP) .................................... 14152344

(51) Int. Cl.
| C09D 133/10 | (2006.01) |
| C09D 133/08 | (2006.01) |
| C09D 5/16 | (2006.01) |
| C09D 5/00 | (2006.01) |
| C09D 133/04 | (2006.01) |

(52) U.S. Cl.
CPC ............. C09D 133/10 (2013.01); C09D 5/00 (2013.01); C09D 5/1681 (2013.01); C09D 133/04 (2013.01); C09D 133/08 (2013.01)

(58) Field of Classification Search
CPC .. C09D 133/10; C09D 133/08; C09D 5/1637; C09D 5/1681
See application file for complete search history.

(56) References Cited

U.S. PATENT DOCUMENTS

2011/0111656 A1* 5/2011 Gao ..................... C09D 127/18
442/59
2012/0308072 A1* 12/2012 Lef Bvre ............... B41M 3/008
382/100

FOREIGN PATENT DOCUMENTS

| EP | 1 144 332 B1 | 10/2003 |
| EP | 1 441 016 A1 | 7/2004 |
| EP | 2 116 518 A1 | 11/2009 |
| JP | 63066273 A | 3/1988 |
| WO | 00/39049 A1 | 7/2000 |

OTHER PUBLICATIONS

All references (except for EP1 144 332) were cited in International Search Report for priority application PCT/EP2014/077401, dated Mar. 6, 2015.

* cited by examiner

*Primary Examiner* — Robert D. Harlan
(74) *Attorney, Agent, or Firm* — Cowan, Liebowitz & Latman, P.C.

(57) ABSTRACT

The invention relates to a composition containing a hydrophobic wax, a silicon oil which primarily contains non-polar lateral chains, a hydrophilic binding agent pigment and/or filler, said composition having a pigment volume concentration of 25-60%. The invention also relates to a coating on a substrate surface containing a hydrophobic wax, a silicon oil which primarily contains non-polar lateral chains, a hydrophilic binding agent pigment and/or filler, said composition having a pigment volume concentration of 25-60%.

14 Claims, 9 Drawing Sheets

COMPOSITION FOR COATING

CROSS REFERENCE TO RELATED APPLICATIONS

This is a U.S. national stage of application No. PCT/EP2014/077401, filed on Dec. 11, 2014. Priority under 35 U.S.C. § 119(a) and 35 U.S.C. § 365(b) is claimed from European Patent Application Nos. 14152344.9 filed Jan. 23, 2014 and 13196807.5 filed Dec. 12, 2013, the disclosures of which are incorporated herein by reference.

DESCRIPTION OF INVENTION

The present invention relates to a composition for coatings, in particular for surfaces exposed to outdoor weathering and a coating obtainable from this composition.

Surface coatings which are exposed to weather are also exposed to the growth of microorganisms which is facilitated by moisture on or in the surface. Consequently rapid drying of the surface is desirable and can be achieved through appropriate coatings. The following principles apply here.

With so-called (highly) hydrophobic coatings, a high contact angle is formed, causing water to bead up on the surface—driven by the force of gravity. Liquid water is removed quickly. This is described in detail in EP 1 144 332.

In the case of (super)hydrophilic coatings, no spherical beading droplets of water are formed on the surfaces, but instead the droplets of water spread out, and in the worst case, form a film of water, which may run off under some circumstances. If the water film does not run off completely, then the water film forms a large evaporative surface, so that the surface can dry again more rapidly due to evaporation.

In rain, the (highly) hydrophobic coatings normally lead to rapid drying, whereas the (super)hydrophilic coatings absorb a large amount of water and release it again to the environment slowly only after the rain has stopped. However, a wet coating has a negative effect on the thermal insulation, among other things.

With dew, however, the efficacy of the (highly) hydrophobic coatings is often limited because, in comparison with rain, the droplets that are formed are smaller and the total amount of water is lower than with rain, which is why droplets of an adequate size may not be formed in the case of (highly) hydrophobic coatings.

Consequently, the object of the present invention is to make available a composition for coating, which will also lead to improved re-drying of the surface, even in the presence of dew.

The problem according to the invention was solved by a composition containing
  a hydrophobic wax;
  a silicone oil, which contains mainly non-polar side chains; and
  a hydrophilic binder;
  pigments and/or fillers;
  wherein
  the composition has
  a pigment volume concentration of 25% to 60%.

The composition according to the invention and the resulting coating surprisingly have an increased re-drying and run-off rate. Regardless of theoretical considerations, it is assumed that the composition according to the invention and the coating resulting from it lead to an irregular distribution of the wax and the binder on the surface, which seems to be a result of the addition of silicone oil. Therefore, EXAFS measurements were performed, showing regions of elevated silicon concentration, which seems to support the theory. Droplets of water reaching the surface or forming there, for example, as a result of dew, are thus at the same time on regions of the surface which are covered by wax and by binder/silicone oil. These regions have different surface energies and consequently have different wetting behaviors. Because of the difference in wetting behavior of these regions, it is consequently assumed that the water droplets try to establish different contact angles with the surface, which leads to lower surface tensions, in particular in the transition from regions with different wetting behavior, and therefore results in the droplets combining more rapidly, which in turn accelerates the runoff of water.

Due to the composition according to the invention, the surface, which is coated with the composition has a definitely reduced hydrophobicity on the whole, in contrast with the (highly) hydrophobic surfaces described above. Lipophilic non-polar substances can no longer adhere as well due to the slightly increased polarity. Thus the soiling resistance to lipophilic and non-polar substances has been increased.

The composition preferably contains:
  0.1 to 10% by weight of the hydrophobic wax;
  0.01 to 2% by weight of the silicone oil;
  10 to 60% by weight of the hydrophilic binder; and
  30 to 80% by weight of the pigments and/or fillers,
    wherein the amount relates to the entirety of the pigments and fillers;
    each based on the solids content of the composition.

To measure the contact angle of the wax and the silicone oil and to determine the surface energy (OFE) and its polar and dispersive components, a mixture of 3.8% by weight wax and/or 1.1% by weight silicone oil, based on the solids content in a polyacrylate binder specified in the experimental part, was used because it is impossible to perform a direct measurement on the pure wax and pure silicone oil. For a detailed determination of the contact angle, reference is made to the experimental part. Unless otherwise indicated, reference is made to this contact angle below with respect to the contact angle of wax and silicone oil. Furthermore, unless otherwise indicated, there was always a 3-minute wait for equilibration before all contact angle measurements.

"Hydrophobic" in the present patent application means that the initial static contact angle of water is >90° after 3 minutes of equilibration.

"Hydrophilic" in the present patent application means that the initial static contact angle of water is ≤90° after 3 minutes of equilibration.

The binder preferably has an initial static contact angle of ≤90° with water after equilibration for 3 minutes, more preferably ≤80°, most preferably ≤75°.

The wax preferably has a initial static contact angle of water, which is at least 5° higher, preferably at least 10° higher than the initial static contact angle of water with the binder after 3 minutes of equilibration.

The initial static contact angle of water after 3 minutes of equilibration of the silicone oil is preferably at least 5° higher, especially at least 10° higher than the initial static contact angle of water of the binder after 3 minutes of equilibration.

The binder normally has a polar component of the surface energy of 10% or more, preferably 15% or more. The polar component is normally no higher than 50%.

The binder normally has a dispersive component of the surface energy of less than 90%, preferably less than 85%.

The polar component of the average OFE of the binder is preferably 2 to 20 mN/m, more preferably 4 to 15 mN/m.

The dispersive component of the average OFE of the binder is preferably 20 to 50 mN/m, more preferably 28 to 40 mN/m.

The average OFE of the binder is preferably 22 to 70 mN/m, more preferably 25 to 50 mN/m, even more preferably 30 to 45 mN/m.

The polar component of the OFE is preferably reduced by adding the wax and/or silicone oil. The wax preferably lowers the polar component of the OFE by at least 8 percentage points, preferably by at least 12 percentage points in comparison with the pure binder.

The reduction in the polar component of the OFE of the binder due to the addition of the wax and/or silicone oil is preferably at least 2 mN/m, more preferably at least 4 mN/m, even more preferably 6 mN/m.

The wax preferably has a polar component of the OFE of 10% or less, more preferably 8% or less.

The wax normally has a dispersive component of the OFE of more than 90%, preferably more than 92%.

The polar component of the average OFE of the wax is preferably 0.1 to 6 mN/m, more preferably 0.5 to 4 mN/m.

The dispersive component of the average OFE of the wax is 22 to 52 mN/m, more preferably 28 to 48 mN/m.

The average OFE of the wax is preferably 23 to 58 mN/m, more preferably 25 to 50 mN/m, even more preferably 29 to 38 mN/m.

The silicone oil preferably has a polar component of the OFE of 8% or less, preferably 6% or less.

The silicone oil normally has a dispersive component of the OFE of more than 90%, preferably more than 92%.

The polar component of the average OFE of the silicone oil is preferably 0.1 to 5 mN/m, more preferably 0.5 to 3 mN/m.

The dispersive component of the average OFE of the silicone oil is preferably 25 to 50 mN/m, more preferably 30 to 45 mN/m.

The average OFE of the silicone oil is preferably 20 to 70 mN/m, more preferably 26 to 50 mN/m, even more preferably 30 to 46 mN/m.

Due to the composition according to the invention, there are regions on the surface with high and low OFE values, expressed by different high or low polar and/or dispersive components of the OFE. The polar component in particular varies greatly, as shown in the experimental part.

The regions with a high OFE normally correspond to the OFE of the binder, and the regions with a low OFE normally correspond to the OFE of the wax.

The OFE of the composition is average from at least 5 measured value pairs (water/diiodomethane) and thus represents an average value of the OFE ("average OFE") of the regions with a high OFE and the regions with a low OFE.

The OFE of the composition is consequently preferably lower by at least 1.5 mN/m than that of the binder, preferably lower by at least 2 mN/m than that of the binder, more preferably lower by at least 3 mN/m than that of the binder.

The polar component of the average OFE of the composition preferably amounts to 1 to 10 mN/m, more preferably 1 to 6 mN/m, even more preferably 1 to 4 mN/m.

The polar component of the average OFE of the composition is preferably at least 2 mN/m lower than the polar component of the average OFE of the binder, more preferably at least 4 mN/m lower than the polar component of the average OFE of the binder, even more preferably at least 6 mN/m lower than the polar component of the average OFE of the binder.

The dispersive component of the average OFE of the composition preferably amounts to 14 to 59 mN/m, more preferably 20 to 50 mN/m, even more preferably 25 to 40 mN/m.

The average OFE of the composition is preferably 15 to 60 mN/m, more preferably 22 to 52 mN/m, even more preferably 27 to 42 mN/m.

The ratio of the dispersive component to the polar component of the average OFE of the composition is preferably 50:1 to 1:1, more preferably 40:1 to 2:1.

The average initial static contact angle of water after 3 minutes of equilibration of the composition is preferably 50° to 130°, more preferably 60° to 125° C., even more preferably 70° to 120°.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

Figure 1:
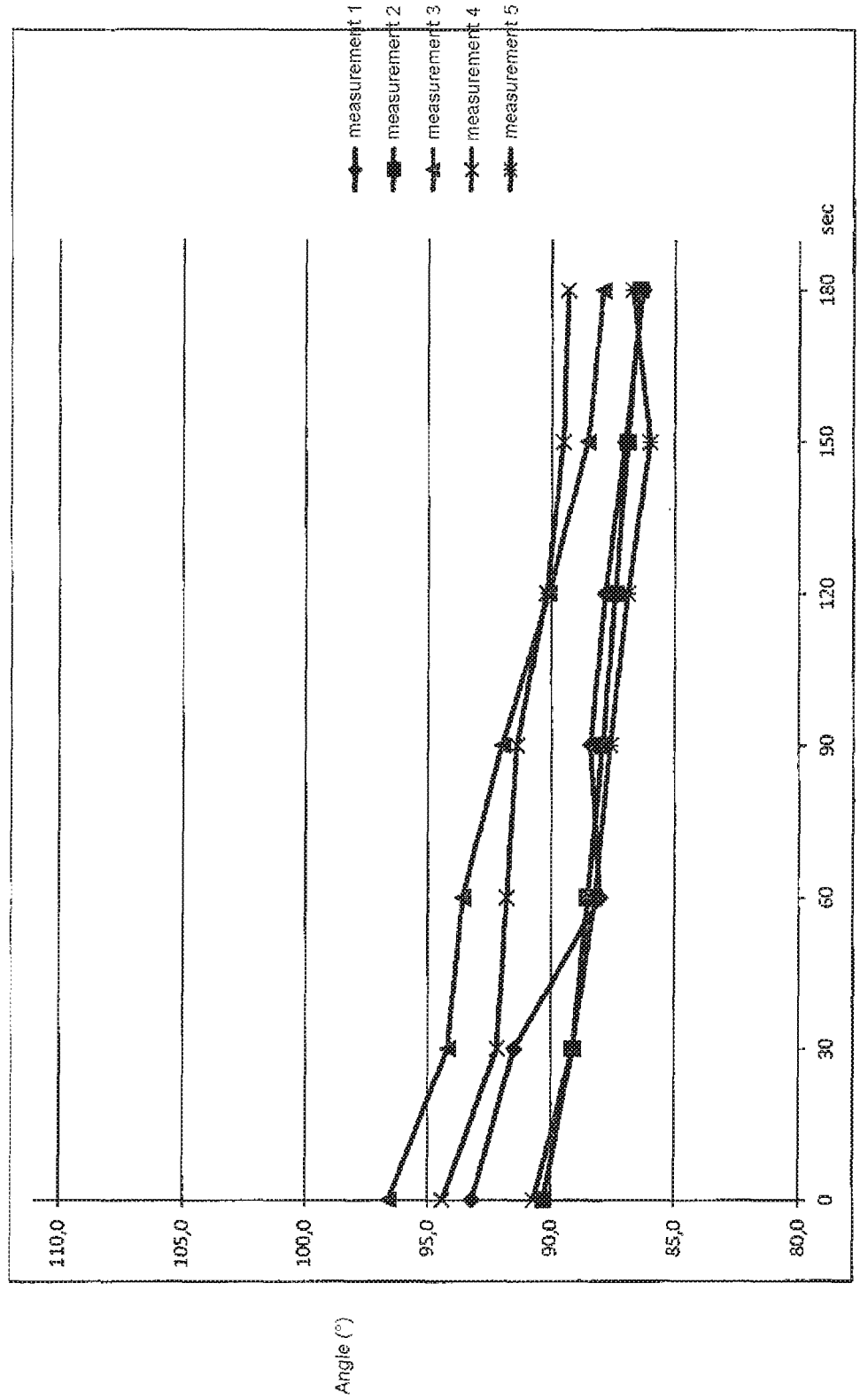
FIG. 1 shows contact angle measurements over time, corresponding to TABLE 3a, with a composition containing 0% wax and 0% silicone oil.
Figure 2:
FIG. 2 shows contact angle measurements over time, corresponding to TABLE 3b, with a composition containing 4.5% wax and 0% silicone oil.
Figure 3:
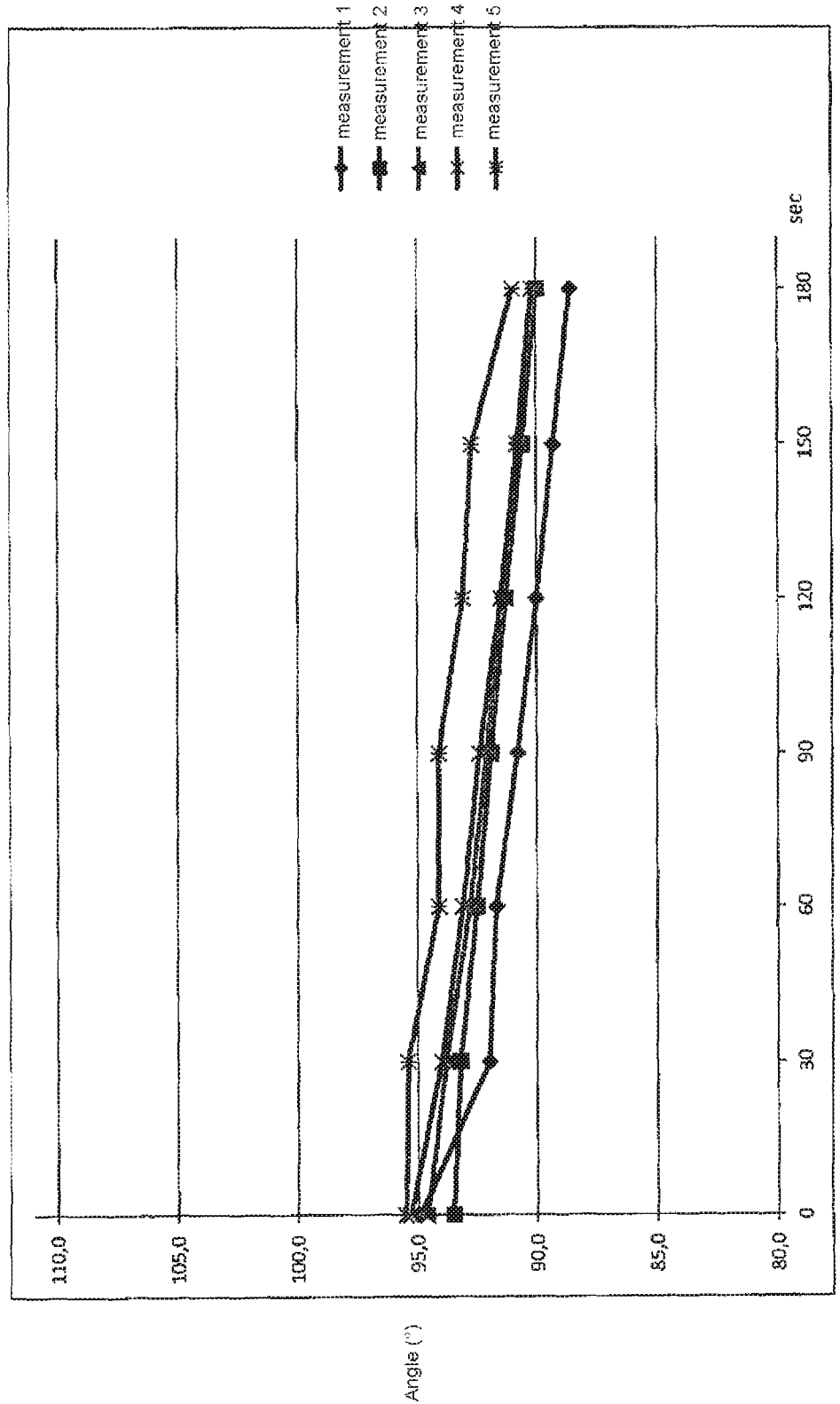
FIG. 3 shows contact angle measurements over time corresponding to TABLE 3c, with a composition containing 0% wax and 0.5% silicone oil.
Figure 4:
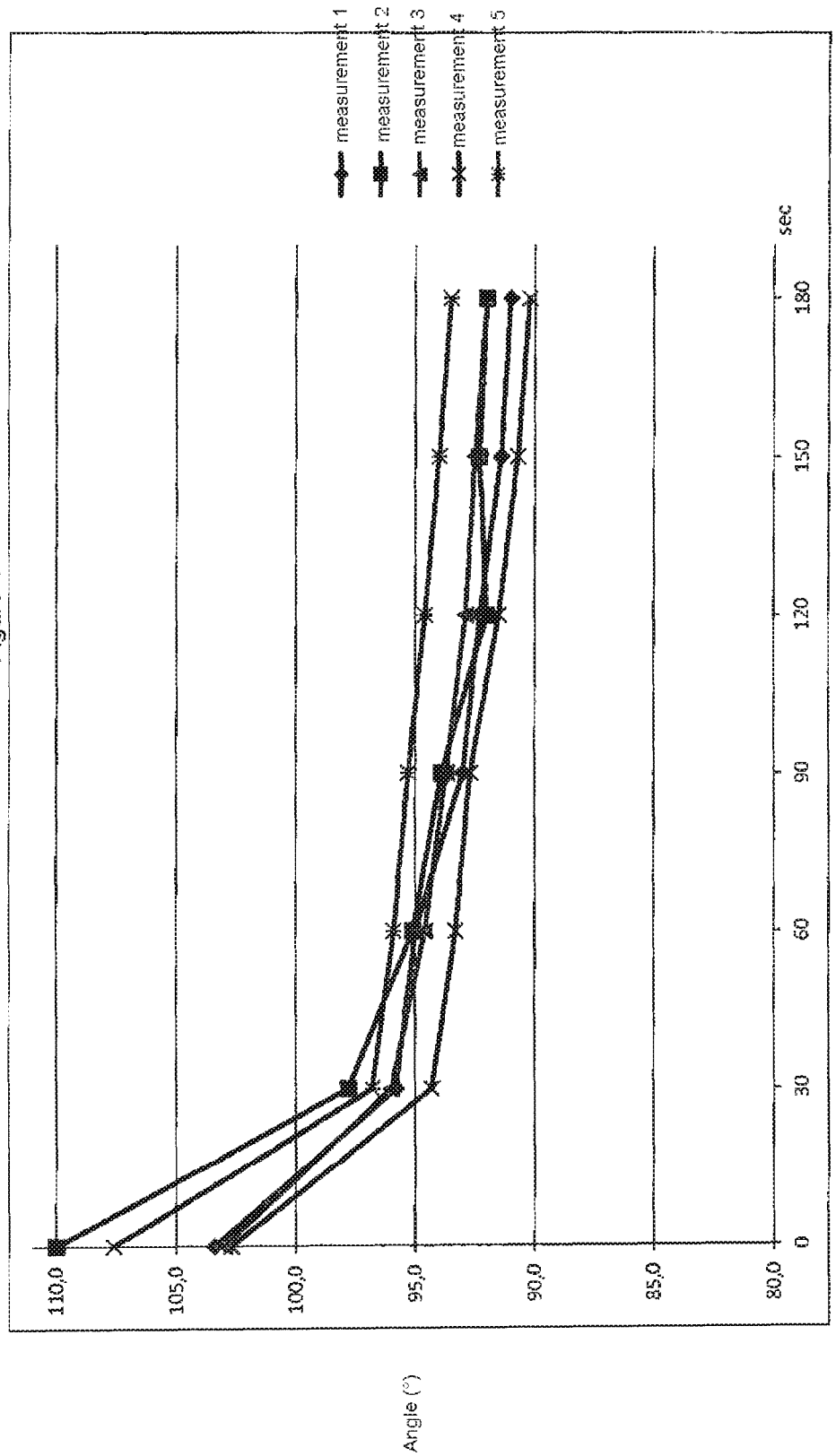
FIG. 4 shows contact angle measurements over time, corresponding to TABLE 3d, with a composition containing 4.5% wax and 0.5% silicone oil.

The initial static contact angle of water after 3 minutes of equilibration of the composition is preferably 2° to 20° high than that of the binder, preferably 5° to 15° higher.

The average initial static contact angle of diiodomethane after 3 minutes of equilibration of the composition is preferably 40° to 60°, more preferably 45° to 55°.

The composition preferably has an initial contact angle with water of more than 100° after 0 sec. The contact angle with water drops more rapidly in comparison with compositions known from the state of the art. The contact angle of the composition with water is usually 130° or less after 0 sec.

The initial contact angle of water after 30 sec equilibration is preferably at least 4° lower, more preferably at least 6° lower than the initial static contact angle of water after 0 sec.

The initial contact angle of water after equilibration for 3 minutes is preferably at least 8° lower, more preferably at least 10° lower than the initial static contact angle of water after 0 sec.

The water content on a surface, which is coated with the composition according to the invention and arranged at a right angle, is preferably less than 10% by weight of the amount of water originally applied after spraying water on it in an amount of 85 g/m² and then waiting 30 min at 23° C. and 50% relative atmospheric humidity, preferably less than 6.0% by weight. The coating is usually applied with a wet layer thickness of 200 µm and then dried for 2 days at room temperature, and the sprayed surface area was usually 414 cm².

After 30 min at 23° C. and 50% relative atmospheric humidity, the water content on the surface arranged at a right angle and coated with the composition according to the invention is preferably less than 3.0% by weight of the amount of water originally applied, preferably less than 2.5% by weight after immersion in water for 1 sec. The coating was usually applied in a wet layer thickness of 200 µm and then dried for 2 days at room temperature, and the sprayed surface area was usually 414 cm².

The binders may be conventional binders, such as those known in the fields of coatings and paints. Preferred binders are homopolymers, copolymers or terpolymers of acrylic acid and/or methacrylic acid, itaconic acid and acid esters, such as ethyl acrylate, butyl acrylate; styrene, substituted or unsubstituted vinyl chloride, vinyl acetate, acrylamides and acrylonitrile; water-dilutable alkyd polymers, combinations of (meth)acrylic/alkyd polymers, polyvinyl alcohol and mixtures thereof.

Homopolymers or copolymers of acrylic acid and/or methacrylic acid are especially preferred.

The silicone oil preferably contains mainly hydrocarbyl side chains, for example, $C_1$ to $C_{20}$ hydrocarbyl side chains, more preferably mainly alkyl side chains, e.g., $C_1$ to $C_{20}$ alkyl side chains. Due to the absence of polar side chains, the silicone oil has a strongly apolar character. The alkyl chains normally contain no more than 5 carbon atoms. Branched and linear polysiloxanes with methyl, ethyl or propyl side chains are especially preferred.

"Mainly non-polar side chains" in the present patent application means that no polar side chains are intentionally introduced during the synthesis of the silicone oils.

"Mainly hydrocarbyl side chains" in the present patent application means that no side chains except for hydrocarbyl side chains are intentionally introduced during the synthesis of the silicone oils.

"Mainly alkyl side chains" in the present patent application means that no side chains except for alkyl side chains are intentionally introduced during the synthesis of the silicone oils.

The situation is similar for $C_1$ to $C_{20}$ hydrocarbyl side chains and $C_1$ to $C_{20}$ alkyl side chains.

In a preferred embodiment, the silicone oil contains only hydrocarbyl side chains, even more preferably only alkyl side chains according to one of the aforementioned embodiments.

The silicone oil preferably does not have any alkoxy side chains. The absence of alkoxy side chains can be determined by the absence of the symmetrical Si—O—C stretching vibration in the FTIR spectrum (940 to 970 $cm^{-1}$).

The silicone oil preferably has a molecular weight of 1,000 to 20,000 g/mol, more preferably 4,000 to 10,000 g/mol.

The silicone oil preferably has a viscosity of 75 to 135 $mm^2/s$, more preferably 85 to 125 $mm^2/s$.

The composition preferably contains only silicone oils which have the aforementioned properties or their preferred embodiments.

As already mentioned, it is assumed that the silicone oil has an effect which leads to an irregular distribution of the wax and the binder on the surface, i.e., interrupting the flow, which is in turn included as one of the causes of the effect according to the invention. In contrast with that, many silicone compounds, for example, wetting agents, which may also be based on silicon, have a flow-promoting effect, which is normally achieved by means of structures containing surfactants.

The pigment-volume concentration and the composition preferably amount to 30% to 55%, more preferably 35% to 50%. The wax preferably has a melting range within the range of 80° C. to 160° C. The wax is usually free of silicon.

Examples include natural waxes, e.g., beeswax, carnauba wax and paraffin waxes and synthetic waxes such as polyalkylene waxes, polyamides, oxidized polyalkylene waxes, waxes of low molecular copolymers of ethylene and acrylic acid and/or acrylates. Polyethylene or polyamide waxes are especially preferred, and polyethylene waxes are most especially preferred. In the case of more than one wax, the amounts and temperature information refer to the totality of the waxes, although it is preferable to use only one wax.

The amount of wax is preferably 0.2 to 5% by weight, based on the solids content of the composition.

The amount of silicone oil is preferably 0.1 to 1.5% by weight, based on the solids content of the composition, more preferably 0.2 to 1.0% by weight, based on the solids content of the composition.

The pigments and/or fillers are preferably selected from pyrogenic silicic acid, precipitated silicic acid, silicon-aluminum-mixed oxides, carbonates for example, alkaline earth carbonates such as calcium carbonate, silicon dioxide, silicates, e.g., aluminosilicates, sulfates, e.g., barium sulfates, titanium dioxide, colored pigments, e.g., iron oxides, bismuth vanadates or mixtures thereof. More strongly preferred are titanium dioxide, silicates and carbonates.

In one embodiment, the pigments and/or fillers consist of inorganic pigments and/or inorganic fillers.

The amount of pigments and fillers is preferably 35% to 50% by weight, based on the solids content of the composition, where the amount is based on the totality of the pigments and fillers.

The particle size of the pigments and fillers is normally in the range of 0.1 to 100 µm, preferably 0.2 to 50 µm.

The composition may also contain up to 8.0% by weight, preferably up to 5.0% by weight of usual additives, based on the solids content of the composition, for example, dispersants, thickeners, wetting agents, biocides, defoaming agents, etc.

The composition is preferably a molding or coating composition, more preferably a paint or plaster.

The composition may also be in the form of an aqueous dispersion. If there is an aqueous dispersion, the amount of water is preferably 20 to 60% by weight. however, the composition according to the invention may also be a dispersion of one or more organic solvents. Such organic solvents may be aliphatic or aromatic hydrocarbons, for example, toluene, alcohols, esters or ketones, which are known solvents for binders and paints. If there is a dispersion of organic solvents, the solvent content is preferably 20 to 50% by weight.

As an alternative, the composition according to the invention may be a dispersion of a mixture of water and the aforementioned organic solvents.

The amount of added water or organic solvent is selected by the skilled person, depending on the intended application. In the case of dispersions of a mixture of water and the aforementioned organic solvents, the water content preferably amounts to more than 50% by weight, based on the total mass of water and organic solvent.

The invention also makes available a coating on a substrate surface, where the coating comprises:
a hydrophobic wax,
a silicone oil, which has mainly non-polar side chains, and
a hydrophilic binder,
pigments and/or fillers,
wherein
the composition has
a pigment-volume concentration of 25 to 60% by weight, preferably a pigment-volume concentration of 35 to 55%.

The coating preferably comprises
0.1 to 10% by weight of the hydrophobic wax;
0.01 to 2% by weight of the silicone oil;
10 to 60% by weight of the hydrophobic binder; and
30 to 80% by weight of the pigments and/or fillers, wherein the amount is based on the totality of the pigments and fillers.

The coating is preferably in an uncured form.

The preferred embodiments of the composition according to the invention are also preferred embodiments of the coating according to the present invention.

The substrate is preferably a wall, with exterior surfaces which are exposed to weathering, for example, exterior facades of buildings, being more preferred.

MEASUREMENT METHODS

Melting Point of Wax:
ISO EN 11357-3
Contact Angle and Surface Energy and their Polar and Dispersive Components Water and diiodomethane were used as test substances for the contact angle. The droplet size was 2 µL to 4 µL for each.

Direct measurement of a wax surface is not possible under some circumstances because the wax may crystallize out as it hardens and thus a measurement is impossible or the wax is too soft, so a mixture of 3.85% by weight wax and 96.15% by weight of the binder listed below, based on the solids content, was produced, and a corresponding coating was prepared. The contact angle measurements were performed on this surface.

Silicone oils are normally viscous fluids and therefore a direct measurement on their surface would normally be impossible. Therefore a mixture of 1.13% by weight silicone oil, based on the solids content and 98.87% by weight of the binder listed below was prepared and a corresponding coating was produced. The contact angle measurements were performed on this surface.

An aqueous dispersion based on a copolymer of acrylic and methacrylic acid esters having a solids content of 46% by weight, a Brookfield viscosity of approximately 7000 mPa·s according to DIN EN ISO 2555 (Spindel 4; 20 rpm; 23° C.), obtainable as Mowilith LDM 7724 from Celanese, was used as the binder.

The static contact angle was determined at 23° C. and 50% relative atmospheric humidity after 2 days of drying. After applying the water droplet and/or the diiodomethane droplet, there was a wait of 180 sec before the measurement was performed.

The contact angle was determined on the three-phase contact line between the solid, liquid and gas using the contact angle measurement device G1 from the company Krüss. At least five droplets were measured in different locations on each test body.

The surface energy was determined according to the method of Owens-Wendt-Rabel-Kaelble as follows (source Krüss AG).

According to OWENS, WENDT, RABEL and KAELBLE, the surface tension of each phase can be split into a polar component and a dispersive component:

$$\sigma_l = \sigma_l^P + \sigma_l^D \quad \text{(equation 1)}$$

$$\sigma_s = \sigma_s^P + \sigma_s^D \quad \text{(equation 2)}$$

OWENS and WENDT base their equation on the interfacial tension:

$$\gamma_{sl} = \sigma_s + \sigma_l - 2(\sqrt{\sigma_s^D \cdot \sigma_l^D} + \sqrt{\sigma_s^P \cdot \sigma_l^P}) \quad \text{(equation 3)}$$

and combined it with the YOUNG equation:

$$\sigma_s = \gamma_{sl} + \sigma_l \cos\theta \quad \text{(equation 4)}$$

These two authors solved the equation system with the help of contact angles of two liquids having known dispersive and polar components of the surface tension. Equations 3 and 4 are combined and the resulting equation is adapted to the general straight-line equation by rearrangement.

$$y = mx + b \quad \text{(equation 5)}$$

The adapted equation looks as follows:

$$\underbrace{\frac{(1+\cos\theta)\cdot\sigma_l}{2\sqrt{\sigma_l^D}}}_{y} = \underbrace{\sqrt{\sigma_s^P}}_{m}\underbrace{\sqrt{\frac{\sigma_l^P}{\sigma_l^D}}}_{x} + \underbrace{\sqrt{\sigma_s D}}_{b} \quad \text{(equation 6)}$$

Figure 9:
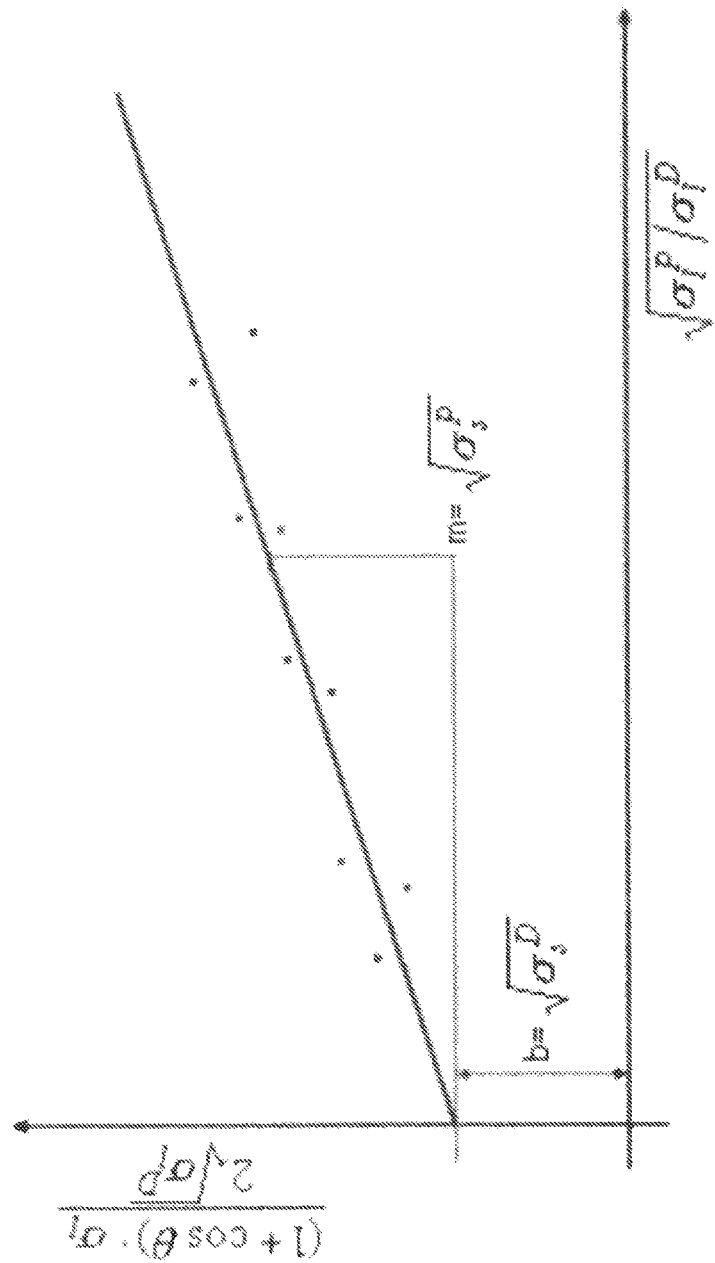
FIG. 9 is a graph that shows a linear regression of the plot y over x in, which yields $\sigma_s P$ from the square of the slope of the line m and $\sigma_s D$ from the square of the ordinate segment b.

In a linear regression of the plot of y over x (shown in FIG. 9), this yields $\sigma_s P$ from the square of the slope of the line m and $\sigma_s D$ from the square of the ordinate segment b.

The surface energies are given in mN/m.

Pigment-Volume Concentration

The pigment-volume concentration (EN ISO 4618-1) indicates the volume ratio between pigments/fillers and the binder in the coating film. The additives, which are also included in the recipe, were not taken into account in the calculation. Solvents and water are no longer present in the hardened film and therefore are also omitted. The wax and silicone oil, if present, were not taken into account in the calculation.

Viscosity of Silicone Oil
DIN 53015
FTIR (Absence of Symmetrical Si—O—C Stretching Vibration)

The measurement was carried out with a Perkin-Elmer Spectrum 100 FTIR spectrometer with a universal ATR accessory. The absence of the symmetrical Si—O—C-stretching vibration at 940-970 $cm^{-1}$ shows the absence of alkoxy side chains.

EXAMPLES

Substances Used:
Binder:

Aqueous dispersion, based on a copolymer of acrylic and methacrylic acid esters, having a solids content of 46% by weight and a Brookfield viscosity of approximately 7,000 mPa·s according to DIN EN ISO 2555 (spindel 4; 20 rpm; 23° C.), obtainable as Mowilith LDM 7724 from Celanese.

Inorganic Pigment:

titanium dioxide, average particle size <1 μm

Inorganic Fillers:

calcium carbonate, average particle diameter $D_{50}$=2.5 μm

Magnesium Silicate:

aluminum silicate, average particle diameter $D_{50}$ 25 μm

Wax:

polyethylene wax with a melting range from 100° C. to 110° C., a density of 0.98 g/cm³ and a viscosity of 40 mPa·s (DIN 53019 1.921s-1). Dispersion with a solids content of 35% by weight.

Silicone Oil:

Alkoxy group-free dimethyl polysiloxane having a viscosity of 90 mm²/s and a molecular weight of 6100 g/mol.

First, mixtures of the pure binder and wax and/or silicone oil were investigated. To do so, the compositions from Table 1 were applied with a wet layer thickness of 200 μm and then dried as explained above, and after 3 minutes of equilibration time, the contact angle of the droplet on the surface was determined with water and diiodomethane; the OFE and the dispersive (DA) component as well as the polar (PA) component of the OFE were also determined.

The quantitative amounts of the PE wax in Table 1 are based on an aqueous dispersion with a solids content of 35% by weight, and those of the binder refer to an aqueous dispersion with a solids content of 46% by weight. The silicone oil was in the form of a pure compound.

TABLE 1

| | Contact angle [°] | | | | | | | |
|---|---|---|---|---|---|---|---|---|
| | water | diiodo-methane | OFE* | DA* | PA* | DA [%] | PA [%] | DA/PA |
| Binder | 73.4 | 53.3 | 40.4 | 32.4 | 8.0 | 80.2 | 19.8 | 4.0 |
| binder +5% by wt wax | 91.7 | 54.2 | 33.5 | 31.9 | 1.6 | 95.3 | 4.7 | 20.2 |
| binder +0.5% by wt. silicone oil | 88.4 | 44.4 | 38.9 | 37.3 | 1.6 | 96.0 | 4.0 | 23.9 |
| binder +4.5% by wt. wax +0.5% wt. silicone oil | 89.3 | 47.4 | 37.3 | 35.7 | 1.6 | 95.8 | 4.2 | 22.8 |
| Binder +5% by wt wax +0.5% wt silicone oil | 89.9 | 47.8 | 37.0 | 35.5 | 1.5 | 96.0 | 4.0 | 24.0 |

*unit [mN/m]

This shows the definite increase in the contact angle of water when wax and/or silicone oil is added.

In addition the following composition was prepared and the contact angle, the OFE and their polar and dispersive components of the resulting coating were determined (amounts in % by weight).

| | |
|---|---|
| water: | 10.0 |
| acrylate-binder dispersion solids content 46% by weight | 43.0 |
| titanium dioxide | 14.0 |
| fillers (silicate/carbonate) | 24.0 |
| additive (dispersant, thickener, foam suppressant, biocide, etc.) | 3.5 |
| PE wax dispersion solids content 35% by weight | 5.0 |
| dimethyl polysiloxane | 0.5 |

The resulting coating had a PVK of 40%.

In addition the pigment and filler components were varied to obtain compositions with a PVK of 30, 50 and 60. The results re summarized in the following table.

TABLE 2

| | Contact angle [°] | | | | | | | |
|---|---|---|---|---|---|---|---|---|
| | water | diiodo-methane | OFE* | DA* | PA* | DA [%] | PA [%] | DA/PA # |
| PVK 30 | 86.6 | 49.3 | 37.1 | 34.7 | 2.4 | 93.5 | 6.5 | 14.4 5.6 |
| PVK 40 | 87.0 | 53.2 | 35.1 | 32.8 | 2.2 | 93.7 | 6.3 | 14.8 5.8 |
| PVK 50 | 83.0 | 49.8 | 37.9 | 34.4 | 3.6 | 90.6 | 9.4 | 9.6 4.4 |
| PVK 60 | 94.5 | 50.5 | 34.8 | 34.0 | 0.8 | 97.7 | 2.3 | 43.0 7.2 |

*unit [mN/m]
PA (binder)—PA [mN/m] (composition)

The polar component of the binder amounted to 8.0 mN/m and/o 19.8%.

Between a PVK of 40% and 50% there is a visible and marked improvement in the wetting behavior. At a PVK of 60% the result declined again. It is assumed here that the great amount of pigments and fillers has an effect.

Dynamics of the Contact Angle (Water)

It can be seen below that the change in the contact angle over time takes place much more rapidly with the paint formulation according to the invention than with the reference examples. Furthermore, the difference between the contact angle at 180 sec compared with the contact angle at 0 sec is greater.

To do so, the paint formulation with PVK=40% from the preceding example was used, wherein the wax and silicone components were varied as shown in the following tables 3a to 3d. In the case of the wax, the amounts are based on a dispersion with a solids component of 35% by weight, as indicated above.

TABLE 3a

| No. Description | Reference 1 0% wax 0% silicone oil | | | | |
|---|---|---|---|---|---|
| Time in sec | Measurement 1 | Measurement 2 | Measurement 3 | Measurement 4 | Measurement 5 |
| 0 | 93.2 | 90.3 | 96.6 | 94.4 | 90.7 |
| 30 | 91.5 | 89.1 | 94.2 | 92.2 | 89.1 |
| 60 | 88.0 | 88.5 | 93.6 | 91.8 | 88.2 |
| 90 | 88.4 | 87.9 | 92.0 | 91.4 | 87.6 |
| 120 | 87.8 | 87.4 | 90.1 | 90.2 | 86.9 |
| 150 | 87.0 | 86.9 | 88.5 | 89.5 | 86.0 |
| 180 | 86.3 | 86.4 | 87.9 | 89.3 | 86.7 | n.g. not measured

TABLE 3b

| | Reference 2 |
| No. | 4.5% wax |
| Description | 0% silicone oil |

| Time in sec | Measurement 1 | Measurement 2 | Measurement 3 | Measurement 4 | Measurement 5 |
| --- | --- | --- | --- | --- | --- |
| 0 | 95.9 | 94.6 | 94.4 | 108.5 | 110.3 |
| 30 | 95.0 | 93.6 | 94.2 | 107.6 | 106.7 |
| 60 | 93.8 | 93.1 | 93.8 | 106.8 | 103.7 |
| 90 | 91.8 | 92.6 | 93.4 | 105.8 | 103.1 |
| 120 | 86.2 | 92.0 | 92.7 | 105.1 | 102.5 |
| 150 | 85.2 | 91.5 | 92.1 | 104.7 | 102.3 |
| 180 | 84.5 | 90.9 | 91.4 | 103.9 | 101.4 |

TABLE 3c

| | Reference 3 |
| No. | 0% wax |
| Description | 0.5% silicone oil |

| Time in sec | Measurement 1 | Measurement 2 | Measurement 3 | Measurement 4 | Measurement 5 |
| --- | --- | --- | --- | --- | --- |
| 0 | 94.9 | 93.5 | 94.6 | 95.3 | 95.5 |
| 30 | 92.0 | 93.2 | 93.8 | 94.0 | 95.4 |
| 60 | 91.7 | 92.5 | 92.8 | 93.1 | 94.1 |
| 90 | 90.8 | 91.9 | 92.1 | 92.4 | 94.1 |
| 120 | 90.0 | 91.3 | 91.4 | 91.5 | 93.1 |
| 150 | 89.3 | 90.6 | 90.8 | 90.8 | 92.7 |
| 180 | 88.6 | 90.0 | 90.1 | 90.2 | 91.0 |

TABLE 3d

| | According to the invention |
| No. | 0% wax |
| Description | 0.5% silicone oil |

| Time in sec | Measurement 1 | Measurement 2 | Measurement 3 | Measurement 4 | Measurement 5 |
| --- | --- | --- | --- | --- | --- |
| 0 | 103.4 | 110.0 | 103.0 | 102.7 | 107.6 |
| 30 | 95.8 | 97.8 | 96.0 | 94.3 | 96.8 |
| 60 | 95.0 | 95.1 | 94.6 | 93.3 | 95.9 |
| 90 | 93.0 | 93.9 | 93.7 | 92.7 | 95.3 |
| 120 | 92.3 | 92.0 | 92.9 | 91.5 | 94.6 |
| 150 | 91.4 | 92.3 | 92.5 | 90.7 | 94.0 |
| 180 | 91.0 | 92.0 | 92.0 | 90.2 | 93.5 | n.g. not measured

The course of the decline in the contact angle over time is shown in FIGS. 1 to 4.

FIG. 1: Ref 1 composition+0% wax+0% silicone oil
FIG. 2: Ref 2 composition+4.5% wax+0% silicone oil
FIG. 3: Ref 3 composition+0% wax+0.5% silicone oil
FIG. 4: Ref 4 composition+4.5% wax+0.5% silicone oil As the measurements above show, the inventive formulation not only has a higher contact angle at 0 sec but the decline in the contact angle after 180 sec amounts to 12° or more and is thus also higher than in the reference examples. Furthermore, there is a definite decline in the contact angle within the first 30 sec.

The compositions according to the invention also have faster re-drying of the surface.

This was demonstrated on the basis of the following experiments.

To do so, applications with a wet layer thickness of 200 µm on PVC film were prepared and dried for 2 days at room temperature. The surface amounted to 414 cm².

The coated PVC film was suspended and the tare weight was determined. Next it was sprayed with about 3.5 g water from a distance of about 35 cm. The re-drying was observed for 30 minutes and the weight was recorded every 5 minutes. The test was performed in a standard climate of 23° C./50% relative humidity.

To do so, the composition PVK 40 according to the invention, which was described above, was used except that 4.5% by weight wax dispersion was used instead of 5.0% by weight wax dispersion (referred to below as IE3).

IE3 was compared with a highly hydrophobic coating (Ref1) having a contact angle with water of 125° after an equilibration time of 3 minutes and having a hydrophilic surface from a traditional dispersion silicate facade paint without a hydrophobing agent (Ref2). Ref2 appears to be dry visually after about 15 minutes, and, as shown by the measurement, the coating contains a substantial amount of water.

TABLE 4

| | Ref1 | | IE3<br>4.5% wax<br>0.5% silicone oil | | Ref2 | |
| --- | --- | --- | --- | --- | --- | --- |
| | [g] | [%] | [g] | [%] | [g] | [%] |
| Start | 3.71 | 100.0 | 3.52 | 100.0 | 3.51 | 100.0 |
| 5' | 3.29 | 88.7 | 2.17 | 61.6 | 2.20 | 62.7 |
| 10' | 2.82 | 76.0 | 1.50 | 42.6 | 1.74 | 49.6 |
| 15' | 2.34 | 63.1 | 1.00 | 28.4 | 1.25 | 35.6 |
| 20' | 1.45 | 39.1 | 0.35 | 9.9 | 0.57 | 16.2 |
| 25' | 1.45 | 39.1 | 0.35 | 9.9 | 0.57 | 16.2 |
| 30' | 1.05 | 28.3 | 0.16 | 4.5 | 0.30 | 8.5 |

Figure 5:
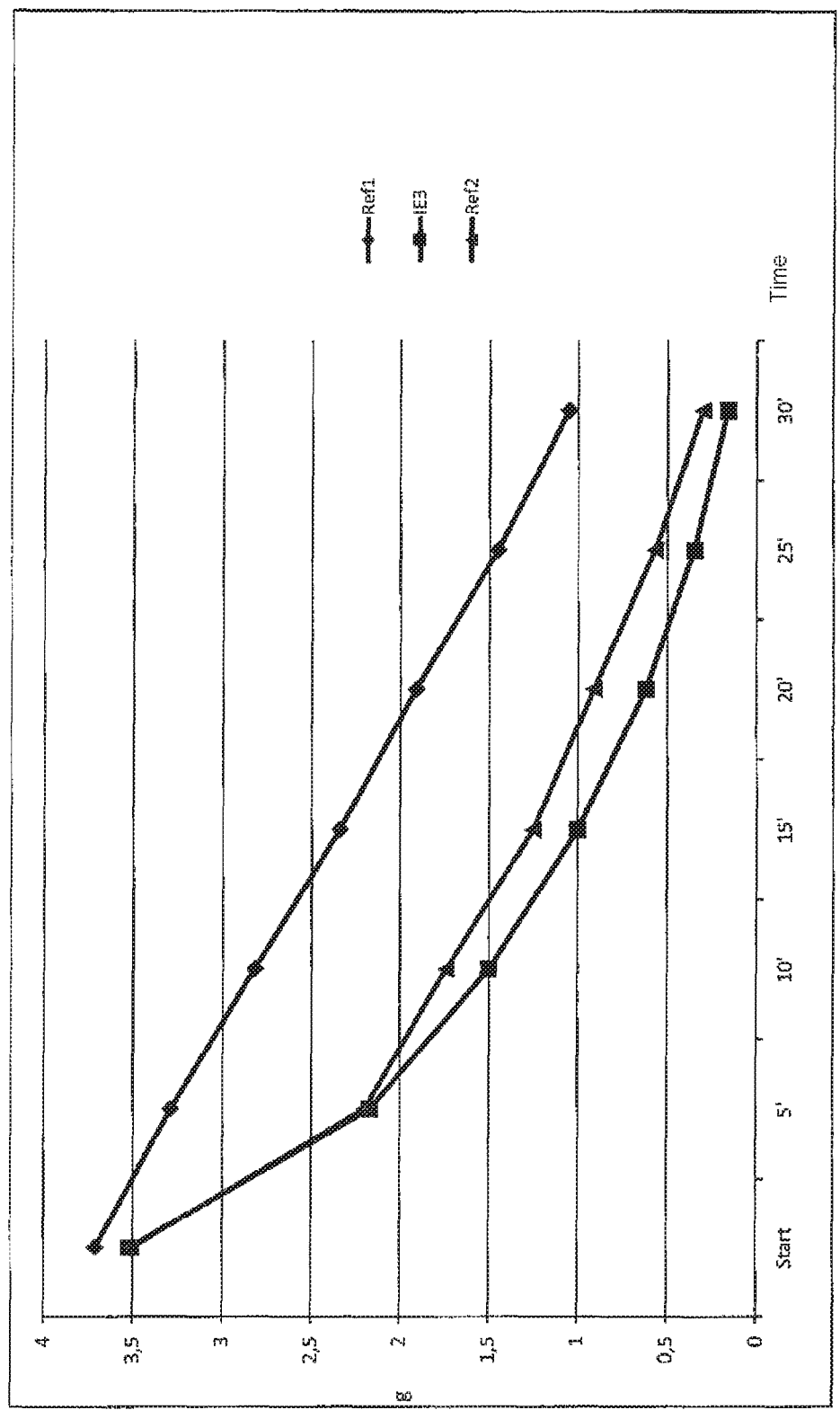
FIG. 5 is a graph that shows the quantity of water remaining in the surface over time, corresponding to TABLE 4, with a composition containing IE3, 4.5% wax, and 0.5% silicone oil, according to one experiment of the present invention.
Figure 6:
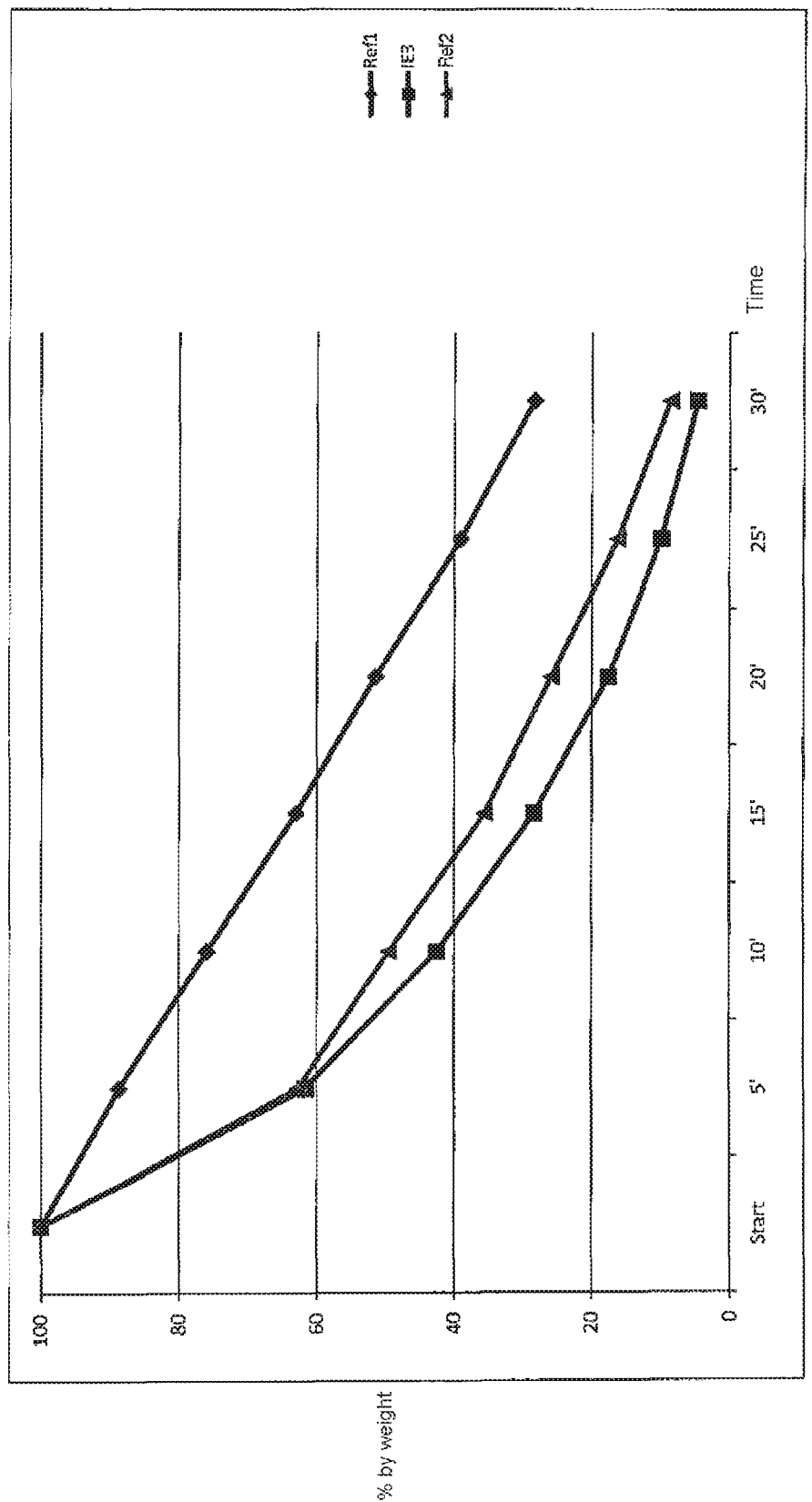
FIG. 6 is a graph that shows weight percent of remaining in the surface over time, corresponding to TABLE 4, with a composition containing IE3, 4.5% wax and 0.5% silk one oil, according to one experiment of the present invention.

FIGS. 5 (wt/time) and 6 (wt %/time) show the plot of the quantity of water remaining in the surface over time.

In addition the coatings defined above were immersed completely in water for 1 sec and then suspended on the scales within 5 sec.

The redrying was observed for 30 min and the weight was recorded every 5 minutes. The testing was performed in a standard climate of 23° C./50% relative humidity.

TABLE 5

| | Ref1 | | IE3<br>4.5% wax<br>0.5% silicone oil | | Ref2 | |
| --- | --- | --- | --- | --- | --- | --- |
| | [g] | [%] | [g] | [%] | [g] | [%] |
| Start | 1.53 | 100 | 1.05 | 100 | 2.60 | 100.0 |
| 5' | 0.52 | 34.0 | 0.26 | 24.8 | 1.69 | 65.0 |
| 10' | 0.26 | 17.0 | 0.19 | 18.1 | 1.21 | 46.5 |
| 15' | 0.12 | 7.8 | 0.13 | 12.4 | 0.79 | 30.4 |
| 20' | 0.08 | 5.2 | 0.10 | 9.5 | 0.45 | 17.3 |
| 25' | 0.06 | 3.9 | 0.06 | 5.7 | 0.21 | 8.1 |
| 30' | 0.03 | 1.0 | 0.02 | 1.9 | 0.10 | 3.9 |

Figure 7:
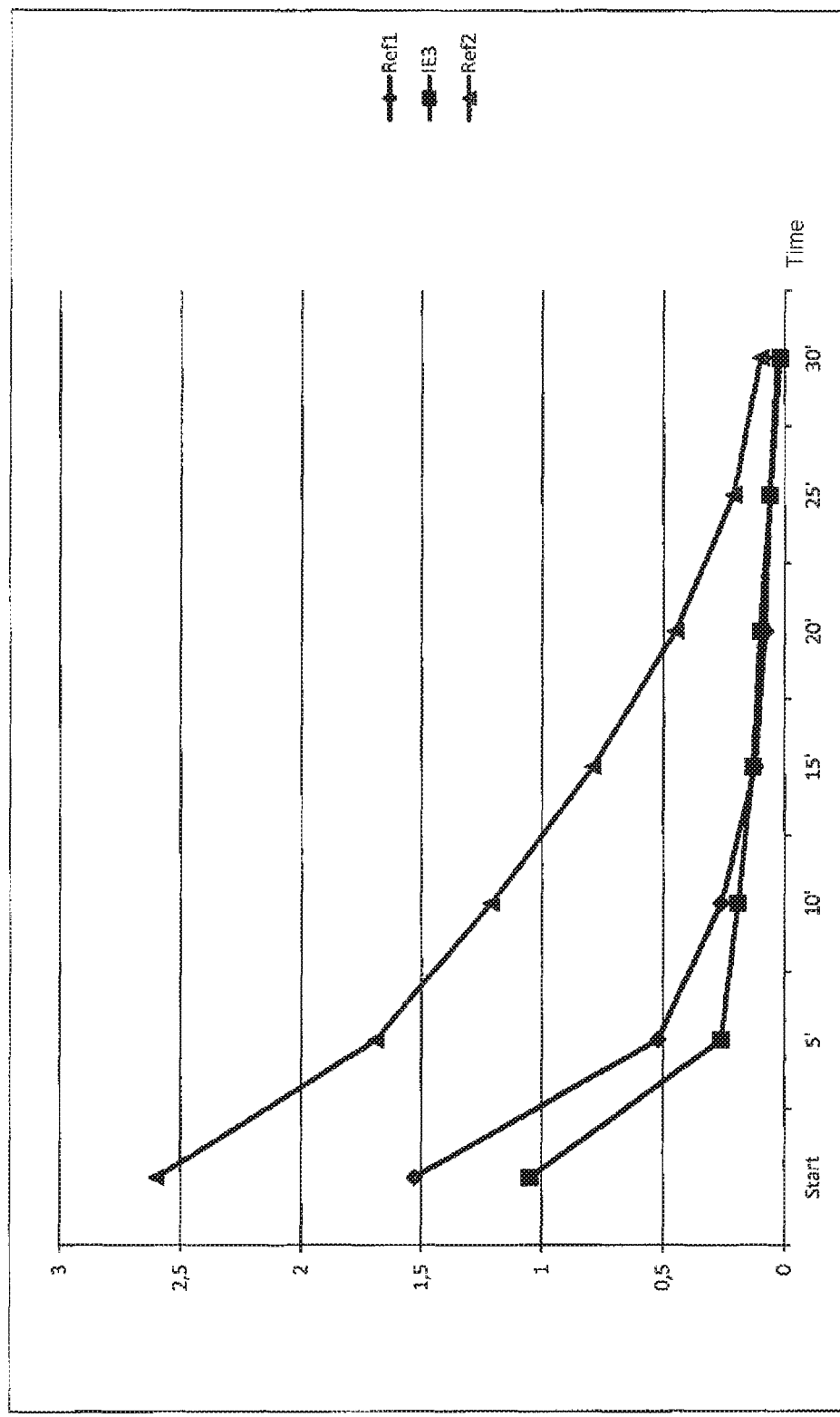
FIG. 7 is a graph that shows the amount of water remaining in the surface over time, corresponding to TABLE 5, with a composition containing IE3, 4.5% wax and 0.5% silicone oil, according to another experiment of the present invention.
Figure 8:
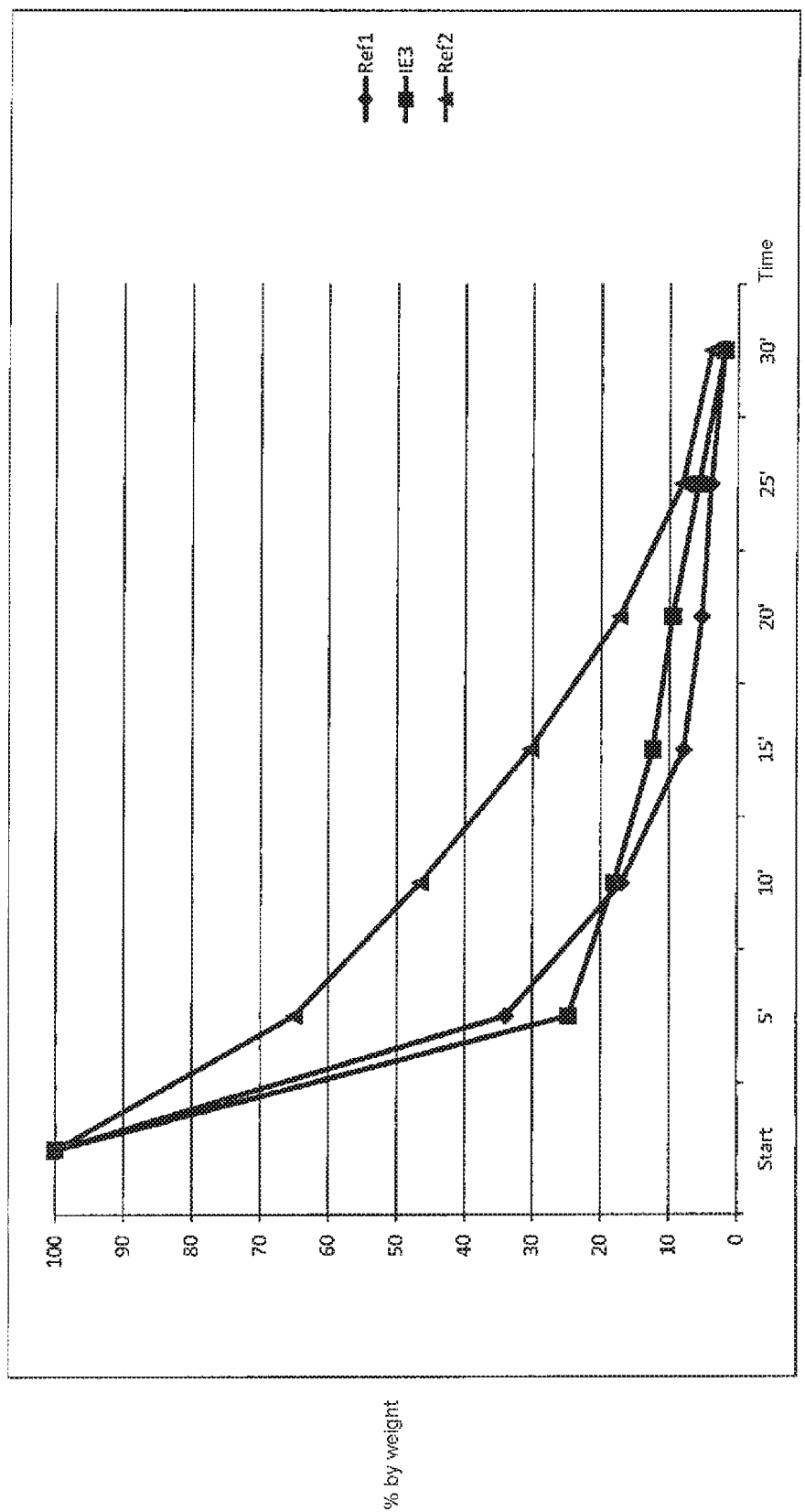
FIG. 8 is a graph that shows weight percent of the amount of water remaining in the surface over time, corresponding to TABLE 5, with a composition containing IE3, 4.5% wax and 0.5% silicone oil, according to another experiment of the present invention.

FIGS. 7 (wt/time) and 8 (wt %/time) show the plot of the amount of water remaining in or on the surface over time.

The water uptake according to EN1062-1 and -3: W value permeability for water

Because of this property, the resistance of the coating to the penetration and uptake of water can be evaluated.

| Ref1 | IE3 | Ref2 |
| --- | --- | --- |
| 0.05 kg/m² · h$^{0.5}$)<br>class W3 | 0.02 kg/m² · h$^{0.5}$)<br>class W3 | 1.17 kg/m² · h$^{0.5}$)<br>class W1 |

The invention claimed is:

1. A composition containing:
   a hydrophobic wax;
   a silicone oil containing mainly non-polar side chains;
   a hydrophilic binder; and
   pigments and/or fillers;
   wherein the composition has a Pigment-Volume Concentration of 25% to 60%.

2. The composition according to claim 1, wherein the wax has a static initial contact angle of water after 3 minutes of equilibration that is at least 5° higher than the initial static contact angle of water of the binder after 3 minutes of equilibration.

3. The composition according to claim 1, wherein the wax has a polar component of a surface energy of 10% or less.

4. The composition according to claim 1, wherein the wax lowers a polar component of a surface energy by at least 8 percentage points.

5. The composition according to claim 1, wherein the silicone oil contains mainly hydrocarbyl side chains.

6. The composition according to claim 1, wherein the silicone oil has an average molecular weight of 1,000 to 20,000 g/mol.

7. The composition according to claim 1, wherein the silicone oil has a viscosity of 75 to 135 mm2/s.

8. The composition according to claim 1, wherein the pigment-volume concentration is 30% to 55% by volume.

9. The composition according to claim 1, wherein the wax is a polyethylene or polyamide wax.

10. The composition according to claim 1, wherein the composition is a molding or coating composition.

11. The composition according to claim 10, wherein the composition is a paint or plaster.

12. A coating on a substrate surface, containing:
    a hydrophobic wax;
    a silicone oil containing mainly non-polar side chains;
    a hydrophilic binder; and
    pigments and/or fillers;
    wherein the composition has a Pigment-Volume Concentration of 25% to 60%.

13. The composition according to claim 1, wherein the composition is used as a molding or coating compound.

14. The composition according to claim 13, wherein the molding or coating compound is a paint or plaster.

* * * * *